3,367,976
SUBSTITUTED RESORCINOL COMPOUND AND METHOD OF MAKING SAME
Barrymore T. Larkin, Valencia, Pa., assignor to Koppers Company, Inc., a corporation of Delaware
No Drawing. Filed Aug. 22, 1966, Ser. No. 573,788
6 Claims. (Cl. 260—611)

This invention relates to tris-substituted resorcinol compounds and to a process for preparing the same. More specifically, the invention relates to tris-substituted resorcinol compounds formed by the reaction of resorcinol with methanolic formaldehyde and a process for the preparation under particular reaction conditions.

Because of the considerable velocity of the reaction between resorcinol and formaldehyde, the reaction of these two compounds generally results in resinous products.

It has now been discovered that monomeric polyoxymethylene derivatives of resorcinol can be formed from resorcinol and formaldehyde, which monomeric compounds contain side chains of repeating units of oxymethylene groups. Unless specific conditions are strictly adhered to, however, resinous materials are formed.

These novel monomeric compounds, containing a large number of polyoxymethylene groups, are excellently suited for uses which require a methylene donor. Exemplary of such a use is as a curing agent for resorcinol-formaldehyde resins. The monomerics are readily activated with mild heating to produce cross-linked resinous products with resin forming materials, and are self-reactive above 100° C. These products are reactive with materials such as urea, melamine (but not melamine-formaldehyde resin), and resorcinol to form resinous products when heated.

The compounds formed by the process of my invention are characterized by the formula:

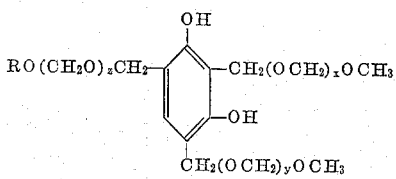

wherein R is a member selected from the group consisting of methyl and hydrogen; $x$ is an integer having a value of 1 to 6, $y$ is an integer having a value of 1 to 6, and $z$ is an integer having a value of 1 to 6, the values of $x$, $y$, and $z$ being such that their sum is equal to 3 to 13.

Because of the difficulty associated with analysis of such compounds, the length of the individual side chains cannot be exactly determined. Analysis by infra-red and nuclear magnetic resonance has shown that the resorcinol ring is tri-substituted. The ring substituents are polyoxymethylene chains terminated by methyl groups with some hydroxyl group termination. The phenolic hydroxy groups are unreacted. The products contain no methylene bridges or polymers (i.e. no resinification). The quantity of reacted formaldehyde has shown that the sum of the individual substituent chain lengths as heretofore described is about 3–13 oxymethylene units. These compounds have been stable for a period of months before gelling. Refrigeration of the products extends their storage life to as long as a year. These resorcinol-methanolic formaldehyde reaction products remained ungelled during their preparation even for several hours at reflux temperatures between 80–90° C.

These novel compounds are formed by the reaction of resorcinol with formaldehyde in the presence of methanol at the reflux temperature of the reaction mixture. Rigorously anhydrous conditions and a charge mole ratio of between 6 to 20 moles of formaldehyde per mole of resorcinol are necessary for their production. The foregoing process permits some free resorcinol to remain with the novel monomeric compounds.

The resorcinol products produced by my process eventually gel at room temperature, but do not harden. A possible explanation for instability of the novel compounds is based on the presence of unremoved water (present initially or formed during the reaction) which could lead to a small proportion of hydroxyl-terminated substituents [HO—$(CH_2O)_n$—] on the resorcinol ring. Such a product would be expected to be unstable, since the methylol groups on the phenolic rings are known to undergo a condensation reaction forming dibenzyl ether links

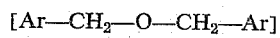

This suggests that only a low cross-linking density would be achieved as a result of instability and that the reactive species was present in a low concentration. The non-hardening of gelled products at room temperature lends weight to this view.

I have found that the presence of free resorcinol tends to stabilize the compound against gelation during room temperature storage. The role of free resorcinol in delaying the gelation of these resorcinol-formaldehyde products may be as a scavenger for hydroxyl-terminated substituent groups. The resorcinol may interfere with the mutual cross-linking action of the hydroxyl-terminated substituents by ready reaction with them, eventually cross-linking the products by a much slower reaction with the predominant methyl-terminated ring substituents.

In accordance with my process, from 40–90% of the charged resorcinol is converted to the novel polyoxymethylated monomeric compound.

The formaldehyde is most suitably added to the reaction mixture as a methanolic solution, but formaldehyde-producing agents may be used. Such agents are the compounds, such as paraformaldehyde, which produce formaldehyde under the conditions of the reaction. In all cases, the formaldehyde must be devoid of water to obtain the desired products.

The mole ratio of charged formaldehyde (F) to resorcinol (R) should be between six to twenty moles of F for each mole of R. The use of lower mole ratios is undesirable. Mole ratios as low as 4F/1R lead to products of relatively unstable nature which change in viscosity until gelled. The products of a high formaldehyde ratio remains almost constant in viscosity until close to eventual gelation.

The formaldehyde concentration influences the resorcinol conversion. Increasing the concentration of formaldehyde in methanol (constant R/F mole ratio) causes higher conversion of charged resorcinol into product. Concentration between 29–58 wt. percent $CH_2O$ in methanol have been so tested.

The temperature of the reaction is preferably the reflux temperature of the reaction mixture. This temperature will vary depending upon the concentration of formaldehyde used and the amount and type of dehydrating agent employed, but will normally be between 70–90° C. The higher temperature gives faster conversion.

The reaction time, which will vary depending upon the temperature of the refluxing mixture, should be about 1–7 hours. Longer times show little advantage, while shorter times result in lower resorcinol conversion.

Anhydrous conditions are essential in accordance with the invention. The reaction mixture must at all times be free of water. It is not only necessary to use water-free reactants, but the water formed during the formaldehyde-resorcinol condensation must also be removed from the system. The water can be removed by mixing a desiccant, such as finely ground calcium sulfate, with the stirred reaction mixture. Preferably, a chemically active drying agent is used, such as 2,2-dimethoxypropane which will react with any water formed to give acetone and methanol. The amount of desiccant or water-reactive compound present should be at least that which is sufficient to remove any water in the initial system and all water which is formed during the condensation reaction. Attempts to remove the water of the reaction by azeotroping with alcohols such as ethanol, and n-butanol have been unsuccessful.

The relative length of the polyoxymethylene chains, determined by the amount of formaldehyde reacted with the resorcinol nucleus, can be varied by controlling the amount of conversion of resorcinol and formaldehyde during the reaction. Such control can be effected by varying the concentration of formaldehyde in the methanolic solution, the higher concentrations resulting in higher conversions. The length of reaction time also has an effect upon the amount of conversion.

My invention is further illustrated by the following examples:

EXAMPLE I

To a three-neck flask equipped with stirrer, thermometer, and reflux condenser was charged dried methanolic formaldehyde (58.3 wt. percent $CH_2O$, 216.0 gms.) and 67.6 gms. of 2,2-dimethoxypropane. The mixture was heated with stirring to 80° C. and then 22.0 gms. (0.20 mole) of solid resorcinol was added during six minutes. A clear solution formed which was then refluxed (82–88° C.) for 6.3 hours. The cooled solution was distilled to remove volatiles to a temperature of 39° C. at 28 mm. Hg abs. The volatile distillate contained acetone, a product of the reaction between 2,2-dimethoxypropane and water, indicating an active role by the dehydrating agent in the presence of resorcinol and formaldehyde. Some unreacted dehydrating agent was also found in the distillate. The thin liquid product residue (164.5 gms.) had a pale yellow color. The viscosity of the product was 90 cps. at 24° C. and the yield based on charged resorcinol was 80%.

Infra-red and nuclear magnetic resonance showed the product to be a tri-substituted monomeric resorcinol compound, the hydroxy groups of the resorcinol molecule being unreacted. The substituted groups were polyoxymethylene chains terminated by methyl groups, with some hydroxy group termination. No methylene bridges were present, indicating monomeric compounds.

The product was stable at room temperature for a period of 44 days before gelling.

EXAMPLE II

To a 500 ml. three-neck, round bottom flask equipped with stirrer, thermometer, and reflux condenser was charged 22 gms. (0.20 mole) of resorcinol, 124.5 gms. of paraformaldehyde (96.5 wt. percent) (4.00 moles) and 104.0 gms. of 2,2-dimethoxypropane (1.00 mole). The methanol for the reaction in this procedure is produced by the splitting of the 2,2-dimethoxypropane on reaction with water to give acetone and methanol. The water for such methanol production is that small amount initially present and that produced by the formaldehyde-resorcinol condensation. The resulting slurry was stirred and heated to reflux during 15 minutes (74° C.). The reflux was continued for 1 hour and 35 minutes, the heating stopped, and the slurry allowed to stand overnight. The slurry was then filtered, using ice-cooled methanol to rinse the flask. The solid residue was 94.7 g. of recovered paraformaldehyde. The clear, brown filtrate was transferred to a three-neck 500 ml. flask and the solvent distilled off until distillate ceased at 63° C./45 mm. pressure. There remained in the flask, 36.5 gms. of amber, thin, liquid product. Analysis of the product by infra-red and nuclear magnetic resonance showed free resorcinol and free methoxymethanol in addition to a resorcinol-formaldehyde product corresponding to a conversion of about 49% of the charged resorcinol. No methylene bridges were present (no resinification) and the resorcinol molecule was tri-substituted with polyoxymethylene chains. The resorcinol hydroxy groups were unreacted. The reacted product had a resorcinol-formaldehyde mole ratio of about 1/10.

EXAMPLE III

To a 500 ml., three-neck round bottom, baffled flask equipped with stirrer, thermometer, and reflux condenser was added 0.20 mole of resorcinol, and 4.0 moles of formaldehyde (29% methanolic solution, dried). To the solution there was added 120 gms. of Drierite ($CaSO_4$). The mixture was stirred and refluxed for 1.4 hours. The cooled mixture was stripped of volatiles by distilling to 68° C. at 150 mm. pressure to leave a residual product, 148.3 gms. The product had a viscosity of 100–150 cps. at 23° C. and a Gardner color of 2. Analysis showed the product to contain a polyoxymethylene-resorcinol compound having a resorcinol to formaldehyde ratio of 1 to 16.7. The monomeric tri-substituted resorcinol molecule contained unreacted hydroxy groups and polyoxymethylene groups. No methylene bridges were found. The conversion of charged resorcinol was 62%. The product also contained 7% free resorcinol and 31% free methoxymethanol. The polyoxymethylene-resorcinol product was stable at room temperature for 56 days without change in viscosity.

EXAMPLE IV

A number of experiments were run to demonstrate the stabilizing effect of a high charge ratio of formaldehyde in preparing the products of the invention. Six experiments were run generally according to the procedure of Example III. Samples of the product were then taken to determine stability of the products. The storage life was determined by placing a sample of each of the resorcinol (R)-formaldehyde (F) products in stoppered glass viscosity tubes and then keeping them at room temperature (21–23° C.) until they gelled.

The degree of stability among samples was judged by retention of initial low viscosity and by the time elapsed between preparation and gelation of observed products. The results are given in Table I.

The addition of small amounts of acid or base to any of the samples shortened the time of stable room temperature storage.

TABLE I.—STABILITY OF LIQUID R/F PRODUCTS AT ROOM TEMPERATURE

| Expt. No. | Charged Mole, ratio | Reacted Mole, ratio | Percent Resorcinol Conversion | Original Product Viscosity (cps. 23° C.) | Days at room temp. W/O Viscosity Increase | Days to gel at room temperature |
| --- | --- | --- | --- | --- | --- | --- |
| 1 | 1R/2F | 1F/1.3R | 65 | 300 | 1 | 15 |
| 2 | 1R/4F | 1R/1.0F | 50 | 100–150 | 23 | 36 |
| 3 | 1R/8F | 1R/2.7F | 60 | 100–150 | 37 | 40 |
| 4 | 1R/12F | 1R/4.6F | 55 | 100–150 | 37 | 42 |
| 5 | 1R/20F | 1R/8.8F | 45 | 100–150 | 75 | 77 |
| 6 | 1R/20F | 1R/16.7F | 55 | 100–150 | 56 | 59 |

EXAMPLE V

An aqueous formaldehyde solution (50 wt. percent $CH_2O$) was prepared by a NaOH-catalyzed depolymerization of paraformaldehyde in water at 60–95° C. At 95° C., the nearly-clear solution quickly became neutral (pH 7.0). The solution was then cooled at 60° C., where resorcinol was added over a two-minute period in 1R/20F mole ratio. The reaction system was brought to 85° C. (seven minutes) and held between 82–85° C. thereafter, with continuous agitation. The reactor contents gelled abruptly after 13 minutes, forming a soft, rubbery solid insoluble in aqueous NaOH. Thus, a distinct difference in stability between aqueous and methanolic (Example I) resorcinol-formaldehyde reaction systems was demonstrated.

EXAMPLE VI

A solution of ethanolic formaldehyde was prepared by depolymerization of paraformaldehyde in absolute ethanol followed by azeotropic removal of water (removal of water from charged paraformaldehyde). Resorcinol was dissolved in the ethanolic-formaldehyde solution at room temperature, the mole ratio of formaldehyde to resorcinol being 14 to 1. The concentration of the formaldehyde in the ethanol was 33 weight percent. The mixture was heated to 92° C. where azeotropic removal of water began, using a Vigreaux column to minimize formaldehyde loss. With distillation of ethanol, the pot temperature rose from 93 to 101° C. over a 0.9 hour period, followed shortly by gellation of the reaction mixture.

EXAMPLE VII

A reaction product prepared according to Example III was heated in a glass flask. The product was heated slowly up to 100° C. with no noticeable effect on the product. At 100° C., formaldehyde was generated. On continued heating to 105° C., an exothermic reaction began and the product swiftly cross-linked with itself to form a resinous insoluble mass, evidencing the ability of the product to react with itself.

EXAMPLE VIII

A reaction product prepared according to Example III, was tested as a curing agent for various materials. To 7.0 gms. of reactant in each of three separate test tubes, there was added 3.0 gms. of the polyoxymethylated-resorcinol product. A control tube containing only the polyoxymethylated-resorcinol product was prepared. Each tube was then held at 45° C. until the pure polyoxymethylated-resorcinol reaction product itself gelled lightly (ca. 48 hours). Table II identifies the reactant employed in each experiment and lists the results of the tests:

TABLE II

| Experiment No. | Reactant | Result |
|---|---|---|
| 1 | Urea | Solid mass—Somewhat elastic. |
| 2 | Melamine | Solid mass—Cross-linked insoluble mass. |
| 3 | Resorcinol-Formaldehyde Resin. | Solid mass—Cross-linked insoluble mass. |
| 4 | None | Soft gel—Elastic. |

I claim:
1. A process for the production of a liquid, non-resinous resorcinol-formaldehyde reaction product containing 6–16 moles of formaldehyde per mole of resorcinol comprising: refluxing a mixture of resorcinol and formaldehyde, said formaldehyde to resorcinol being present in a mole ratio of 6–20/1, in the presence of methanol and under anhydrous conditions and maintaining the reaction mixture substantially anhydrous during reflux by removing the water of reaction formed during reflux.

2. The process of claim 1 wherein the mixture is refluxed for a period of 1–7 hours.

3. The process of claim 1 wherein said refluxing is at a temperature of between 70–90° C.

4. The process of claim 1 wherein said mixture contains a chemically-active drying agent whereby said water of reaction is removed in situ by reaction with said chemically-active drying agent.

5. The product produced by the process of claim 1.

6. A curing agent composition comprising the product of claim 5 and a stabilizing amount of resorcinol.

References Cited

UNITED STATES PATENTS

| 2,443,197 | 6/1948 | Rhodes | 260—611 XR |
| 3,242,118 | 3/1966 | St. Clair et al. | 260—611 XR |

BERNARD HELFIN, *Primary Examiner.*